United States Patent [19]
Atkinson

[11] 3,785,709
[45] Jan. 15, 1974

[54] FORCE-POSITION DECOUPLER FOR ELECTROSTATIC GYROSCOPE SUSPENSION SYSTEM

[75] Inventor: James L. Atkinson, La Mirada, Calif.

[73] Assignee: North American Rockwell Corporation, El Segundo, Calif.

[22] Filed: June 7, 1972

[21] Appl. No.: 260,625

[52] U.S. Cl. .................................................. 308/10
[51] Int. Cl. ............................................ F16c 39/06
[58] Field of Search ..................... 308/10; 74/5.46; 73/472

[56] References Cited
UNITED STATES PATENTS

| | | | |
|---|---|---|---|
| 3,697,143 | 10/1972 | Klinchuch | 308/10 |
| 3,334,949 | 8/1967 | Atkinson | 308/10 |
| 3,338,644 | 8/1967 | Atkinson | 308/10 |
| 3,399,002 | 8/1968 | Atkinson | 308/10 |
| 3,508,445 | 4/1970 | Penney | 308/10 |
| 3,642,334 | 2/1972 | Atkinson | 308/10 |

*Primary Examiner*—R. Skudy
*Attorney*—H. Fredrick Hamann, Rolf M. Pitts and George Jameson

[57] ABSTRACT

In a suspension and pickoff system for an electrostatic gyroscope, a sensing circuit substantially decouples position signal information from a control signal for utilization by two parallel feedback servomechanism paths which respectively separate the position signal into high and low frequency signal components. The composite output from the two paths is selectively disconnected from position control to allow the control signal output from an amplifier to die out. For a preselected portion of each period of time that the composite output is disconnected, the position signal information from the sensing circuit is sampled and held in one of the paths for use when the composite output is again connected into servocontrol.

7 Claims, 25 Drawing Figures

FIG. 6a
20 KHZ
REF

FIG. 6b
T1,1 — OFF, ON, OFF

FIG. 6c
T2,1 — SAMPLE, HOLD, SAMPLE

FIG. 6d
T1,2 — ON, OFF, ON, OFF

FIG. 6e
T2,2 — HOLD, SAMPLE, HOLD, SAMPLE

FIG. 6f
T1,3 — ON, OFF, ON, OFF

FIG. 6g
T2,3 — HOLD, SAMPLE, HOLD, SAMPLE

FIG. 6h
T1,4 — ON, OFF, ON

FIG. 6i
T2,4 — HOLD, SAMPLE, HOLD

FIG. 7

FIG. 8a 20 KHZ REF
FIG. 8b INTEGRATOR OUTPUT
FIG. 8c SQUARING CKT OUTPUT
FIG. 8d LEADING EDGE DIFFERENTIATOR
FIG. 8e TRAILING EDGE DIFFERENTIATOR
FIG. 8f T1,1
FIG. 8g T2,1

FIG. 9

FORCE-POSITION DECOUPLER FOR ELECTROSTATIC GYROSCOPE SUSPENSION SYSTEM

BACKGROUND OF THE INVENTION

The present invention is directed to a system for electrostatically supporting an electrically conductive sphere in space and more particularly to a means for decoupling the position information from restoring force signals used in electrostatic type systems, such as is disclosed in U. S. Pat. No. 3,334,949, entitled "Electrostatic Bearing," by James L. Atkinson, the inventor of the present system.

For background information, an electrostatic gyroscope is a free rotor gyroscope in which spherical-bearing support forces are derived from an electric field. The rotor is generally an aluminum or beryllium sphere which may be either solid or hollow. The electrostatic support consists generally of pairs of spherical segment electrodes dispersed around the rotor in a symmetrical array.

Prior known devices for electrically supporting a rotor of a gyroscope are dislcosed, for example, in U.S. Pat. application, Ser. No. 50,604, entitled "Electrostatic Support System," by J. L. Atkinson. In that application there is disclosed an electrostatic gyroscope which includes a periodic signal source for providing a squarewave reference signal with a pair of amplifiers connected to the electrodes of a pair with each amplifier receiving the periodic signal as an input. A differential amplifier is connected across the pair of electrodes to provide an output signal proportional to the voltage difference between the electrodes and the supported conductive member. Switch means are used to increase or decrease the gain of one amplifier while decreasing or increasing, respectively, the gain of the other amplifier in response to the difference signal so as to increase the magnitude of the periodic signal applied to one electrode and to decrease the magnitude of the periodic signal applied to the other electrode so as to help coerce the electrically supported conductive member towards a centered position.

In U. S. Pat. No. 3,334,949, there is provided a circuit for electrostatically supporting a rotating member between pairs of electrodes by the application of an a-c potential between the supported member and the electrodes. A sensing circuit, which is inductively coupled to the supporting circuit derives a signal which varies as a function of the position of the rotatable member. This position signal is then applied to an amplifier which position signal is used to drive the support circuit to restore the rotating member to a central position. A portion of the signal required for support is always present with the position signal thereby causing a slight error in the position indicating signal. If no control current were present, the pickoff signal would be pure position information.

The present invention implements this particular proposed solution by temporarily disconnecting the amplifier which generates the control current, thereby allowing only position information to exist at the output pickoff.

SUMMARY OF THE INVENTION

According to one aspect of the present invention, there is provided an electrostatic gyroscope of the type which incorporates pairs of electrodes arranged in a symmetrical array around a conductor ball which ball is adapted to be spun about a spin axis. A number of support means corresponding to the number of pairs of electrodes is used to establish an a-c potential between the conductive ball and the pair of electrodes for electrostatically supporting the conductor ball between the electrode pair. A sensing means is provided for each electrode pair for detecting an a-c position signal which signal varies as a function of the position of the conductive ball between the electrode pairs. An amplifying means provides a control signal to the support means which control signal operates to urge the ball towards a central position between the electrode pairs. Two servo feedback channels are used to sense the provided a-c position signal and to provide output signals proportional and compensated with respect to the sensed position signal. One of the feedback means contains a sample and hold circuit which stores for a limited time signals appearing at its input. A summing means is connected to receive the outputs from the feedback servomechanism means which output is connected to the input of the amplifier by means of a first switch. A second switch connects the a-c position control signal to the input of the sample and hold circuit. A switch control means is provided for perrodically activating the first and second switch so as to disconnect the input of the amplifying means and to connect the input to a reference potential, such as ground, so as to cause any transients existing in the amplifier to die out. During this switching period, the second switch is connected to sense the a-c position signal which signal at the sensing time does not contain components of the control signal.

It is, therefore, an object of the present invention to provide an improved system for decoupling position information, restoring force information in an electrostatic supported gyroscope system.

It is another object of the present invention to provide an improved electrostatic suspension system with a decoupled position signal.

Another object of the present invention is to provide an improved suspension and pickoff system for an electrostatic gyroscope.

The foregoing objects of the present invention will become more apparent and better understood when taken in conjunction with the following description and accompanying drawings, throughout which like characters indicate like parts and which drawings form a part of this application.

BRIEF DESCRIPTION OF THE DRAWINGS

FIGS. 8a, 8b, 8c, 8d, 8e, 8f and 8g illustrate, by means of waveforms, the operation of the element shown in FIG. 7.

DESCRIPTION OF THE PREFERRED EMBODIMENTS

Figure 1:
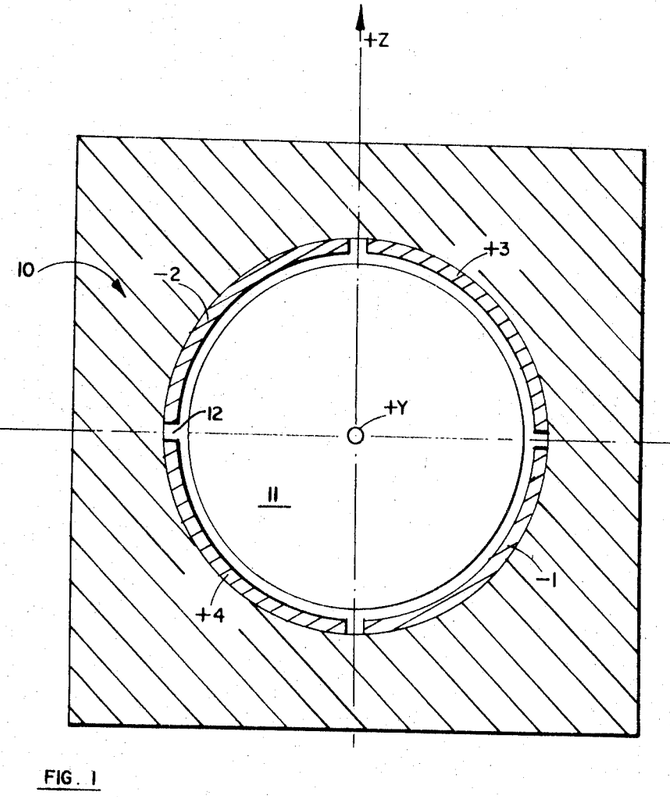
FIG. 1 is a cross-section diagram of an electrostatic gyroscope which may be used in conjunction with the present invention.
Figure 2:
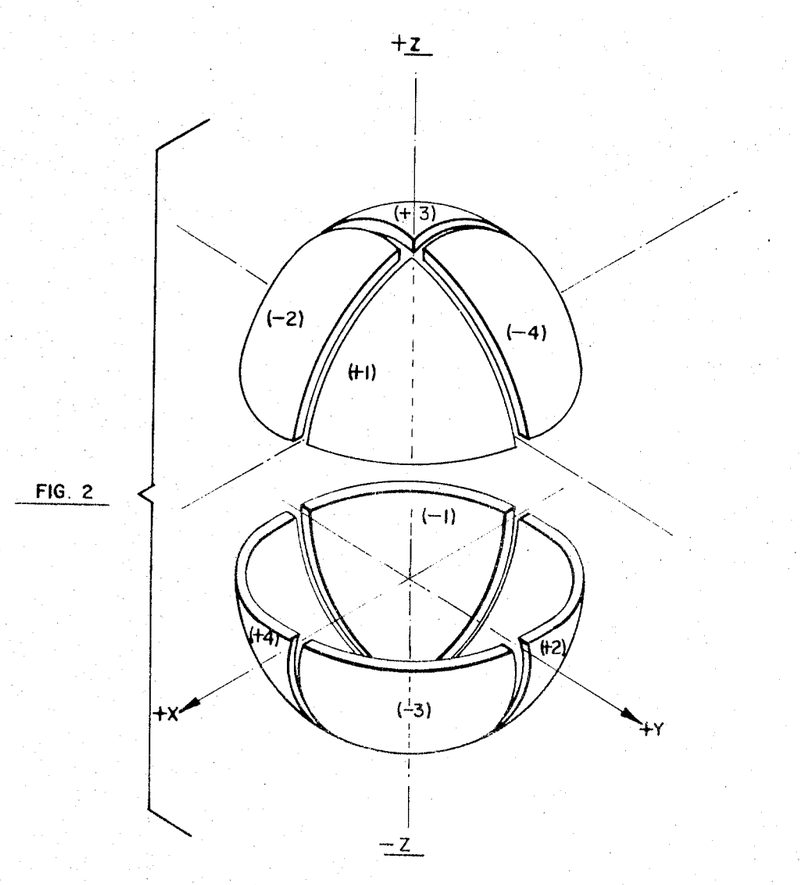
FIG. 2 is an exploded view illustrating one embodiment of the electrode pairs.

FIGS. 1 and 2 show schematically a gyroscope comprised of a nonconductive case 10 with a spherical interior contour and an electrically conducted surface ball 11 which may or may not be spun as a rotor to act as a gyroscope. Within the case 10 is a spherical cavity 12 lined with eight orthogonal electrodes, shown as seen from the outside, in FIG. 2, which are denoted for convenience in analysis as +1 −1, +2 −2, +3 −3, and +4 −4. Each pair, e.g. +1 −1, are diametrically opposed. The electrodes surfaces may be thought of as a projection upon a sphere of the eight faces of a regular octahedron. The axes of the electrode sets are then taken as X Y and Z in FIG. 2. The X and Z axes define a plane along which a section is taken for FIG. 1. A vacuum exists within the spherical cavity 12.

Each pair of electrodes, e.g., +1 −1, are connected into a suspension means to be described such that the departure of the ball 11 from the center of the spherical cavity 12 which, for example, decreases the gap +1 and increases it at −1, results in a voltage decrease and increase, respectively, which voltage decrease or increase is used to center the ball.

Figures 3, 4A:
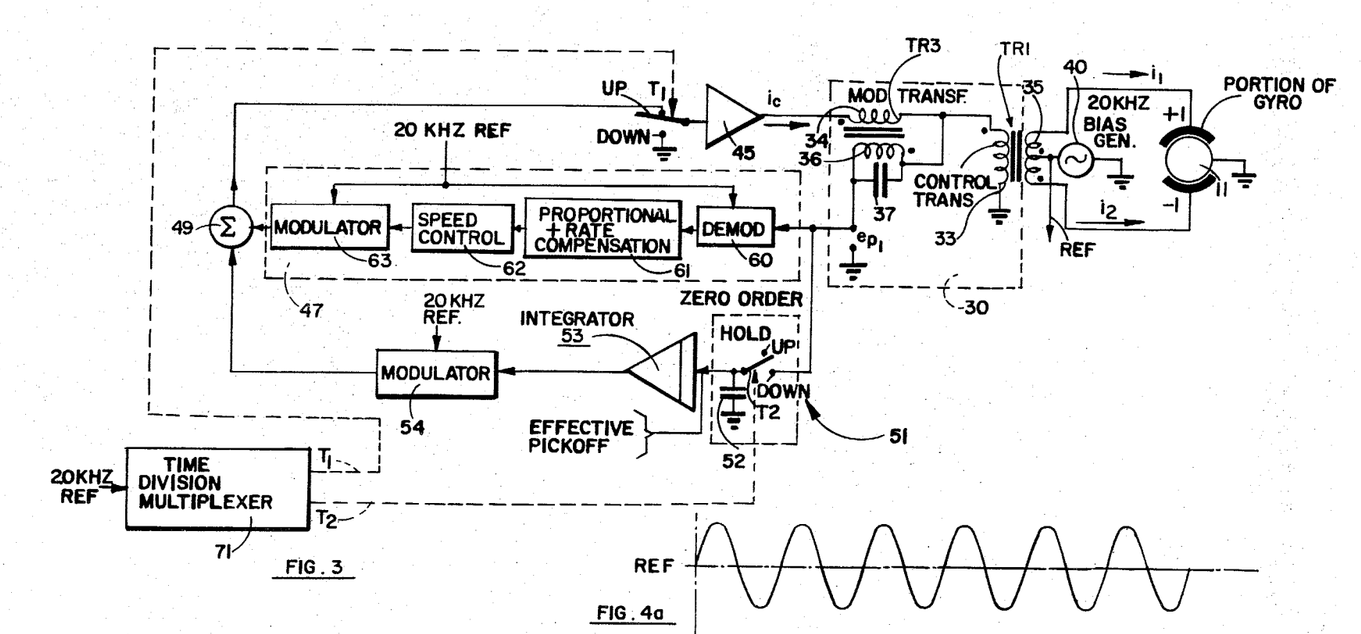
FIG. 3 is a block diagram illustrating a single channel embodiment of the present invention.
FIGS. 4a, 4b and 4c illustrate, by means of waveforms, the operations of the switching sections used in the embodiment of FIG. 3.

Referring to FIG. 3, the rotor 11 is shown connected to virtual ground between only one pair of electrodes −1 and +1, which electrodes are connected to the secondary winding 35 of transformer TR1. The center tap of winding 35 is connected to a bias generator 40 which generator, for the embodiment shown, generates a signal of 20 KHz. The bias generator 40 applies an alternating current between electrodes +1 −1 and sphere 11. This alternating current is of constant and of a sufficient amplitude so as to normally (without external force) support the sphere 11 at a central position between the electrode pair. As is well known, an electrostatically supported gyroscope rotor will coast a considerable length of time in a vacuum after rotary power movement has been applied to the rotor. That is, it is only necessaary to apply a torque to the rotor of an electrostatically supported gyroscope approximately once every year for the rotor to operate as a gyroscope. Means for rotating the gyroscope rotor are well known in the art and form no part of the present invention. The secondary winding 35, transformer TR1, is divided into two equal sections on either side of the center tap with the sections poled as indicated by the dots. When the sphere 11 is centered an equal distance from the electrodes +1 and −1, the two branch currents $I_1$ and $I_2$ will be equal. When these currents are equal, there will be no voltage induced back into the primary 33 of transformer TR1. A model transformer TR3 has one end of its secondary winding 36 connected to the primary of control transformer primary winding 33. Connected across the secondary winding 36 is a capacitor 37. One side of the primary of transformer TR3 is also connected to the primary of transformer 33. Each of the windings of transformers TR3 and TR1 are poled as indicated. The other end of secondary winding 36 is connected to the input of a compensation network 47 and to a zero order hold circuit 51. The signal appearing at this junction point with respect to ground is labeled $e_{p1}$. The zero order hold circuit is comprised of a holding capacitor 52 and a switch T2 which switch has two positions, one of which connects the capacitor to the secondary winding of transformer 36 and the other of which disconnects the capacitor. The capacitor is then connected to the input of integrator 53 with the output of integrator 53 being fed to a modulator 54 which modulator operates against the 20 KHz reference signal from the bias generator 40. The output of modulator 54 is fed to a summing means 49. Summing means 49 also receives as an input the output of the compensation network 47. The output from summing means 49 is fed to one terminal of a switch $T_1$. The other terminal switch $T_1$ is connected to a reference potential in this embodiment ground. The multiple arm of switch $T_1$ is connected to the input of a power amplifier 45. The output of amplifier 45 is connected to the primary winding 34 of transformer TR3. The compensation network 47 is comprised of a demodulator 60 which receives the 20 KHz reference signal, a proportion plus rate compensation network 61, a speed control network 62, and a remodulator 63.

A time division multiplexer 71 receives as an input the 20 KHz reference signal and provides switching control signals to switches $T_1$ and $T_2$.

If the ball 11 is uncentered, the bias currents $i_1$ and $i_2$ will produce a voltage across the transformer winding 33 of transformer TR1. This voltage is called the pickoff signal and will be proportional to the ball displacement from the centered position. However, added to the pickoff signal will be another voltage due to the servo current $i_c$ coming from the power amplifier 45. The cancellation of a portion of the current $i_c$ is accomplished by means of transformer TR3. The cancellation transformer TR3 is wound on the same kind of core as transformer TR1. The windings 34, 36 and 33, all have the same number of turns. By properly adjusting the capacitance of capacitor 37, the servo current $i_c$ will encounter exactly the same impedance in flowing through winding 34 as it does through winding 33, and the voltages produced by the current across windings 34, 36 and 33 will all be identical. Winding 36 subtracts from the pickoff signal output $e_{p1}$ most of the voltage due to the servo current $i_c$. The signal appearing at terminal $e_{p1}$ still contains a small percentage of contamination due to the servo control signal $i_c$.

The signal $e_{p1}$ has been modulated by the 20 KHz bias generator signal source 40. The demodulator 60 operates upon this signal to remove the reference carrier. The demodulated signal is then sent to a standard proportional rate and compensation circuit 61 which may consist of a high frequency rolloff circuit in series with a servo lead lag network feeding an amplifier if gain is needed. Examples of a rate and compensation circuit that can be used for block 61 is disclosed in U.S. Pat. application Ser. No. 77,993, entitled "Speed Control for Electrostatically Supported Ball Gyroscope," by James L. Atkinson et al. The equivalent circuit can be found in FIG. 7 of that patent, which figure also discloses a tuned parallel L-C circuit which can be used as the speed control circuit 62. The speed control circuit is a phase lag circuit that is sharply tuned to cause the levitating electric field to exert either an accelerating or a decelerating coupling force on the ball to bring the speed of the ball to a preselected value determined by the resonance of the phase lag circuit. Modulator 63 modulates the compensated signal from the speed control 62 at the carrier 20 KHz reference rate and feeds that modulated signal as an input to the summing means 49. The frequency response for the first servo means 47 is set to be responsive to frequencies above, for example, 1 or 10 hertz, while the second servo means consisting of the zero order hold 51, the integrator 53, the modulator 54, are set to handle signals below that frequency. The capacitor 52 of the zero order hold passes to ground those signals appearing above the desired threshold frequency. The low frequency channel can, therefore, have an increased gain due to its reduced dynamic range. High frequency channel d-c stability is not a requirement since it does not pass a significant amount of d-c information. The composite output from the summing network is a voltage proportional to the required restoring force necessary to keep the rotor centered in the cavity.

Figure 4B:
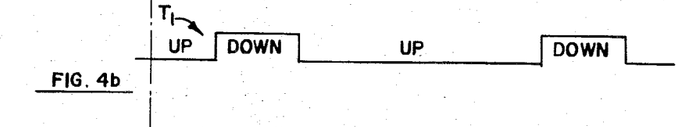
Figure 4C:
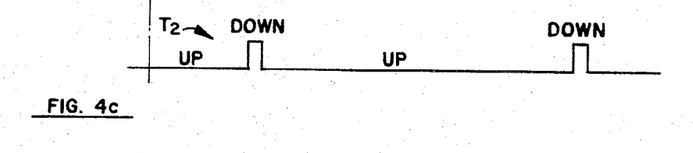

Referring now to FIGS. 4a, 4b and 4c, the reference 20 KHz bias signal is shown in FIG. 4a, the timing of switch $T_1$ is shown in FIG. 4b. As illustrated, switch $T_1$ is grounding the input to amplifier 45 for one cycle out of every four cycles of the 20 KHz reference signal so as to allow the control signal $i_c$ an opportunity to die out. During a small segment of time while the switch $T_1$ is in the down position, the switch $T_2$ is placed in the DOWN position connecting the point labeled $e_{p1}$ to the input of the zero order hold circuit 51. At this point in time, the charge accumulated on the capacitor 52 is directly proportional to the position control signal at the point $e_{p1}$ without the contaminating influence of the voltage created by the control current $i_c$.

Figure 5:
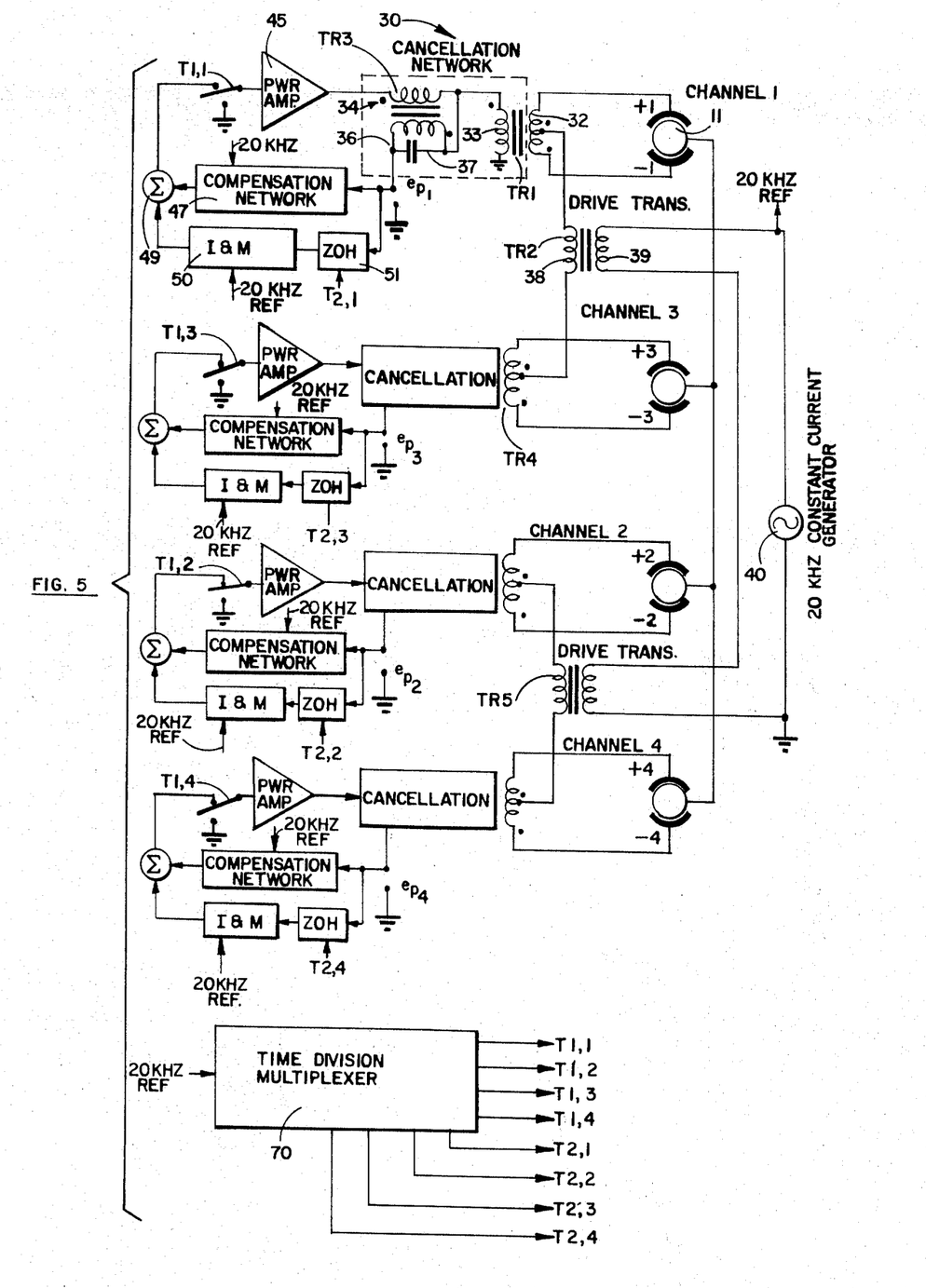
FIG. 5 is a block diagram illustrating a multichannel embodiment of the present invention.
Figure 6A:
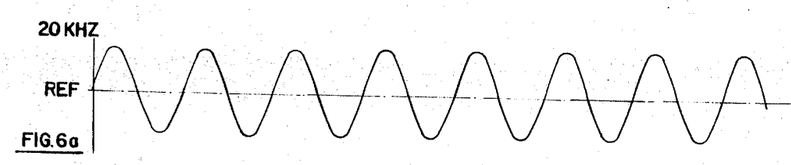
FIGS. 6a, 6b, 6c, 6d, 6e, 6f, 6g, 6h and 6i illustrate, by means of waveforms, the operation of the switching sections of the multichannel embodiment illustrated in FIG. 4.
Figure 6B:
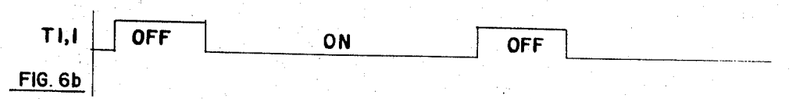
Figure 6C:
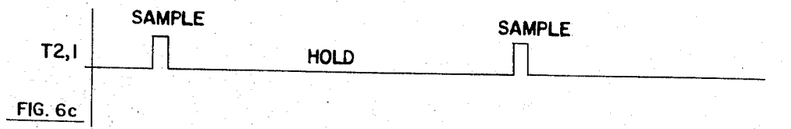
Figure 6D:
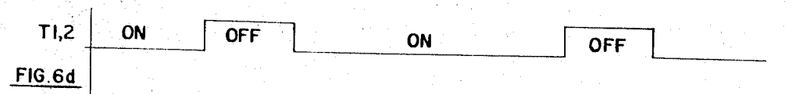
Figure 6E:
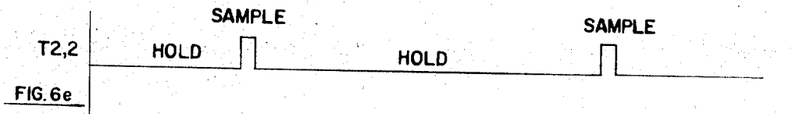
Figure 6F:
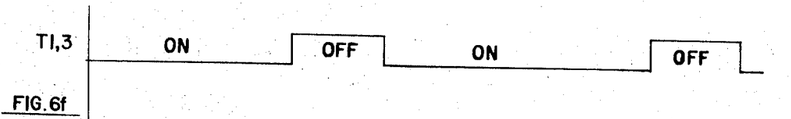
Figure 6G:
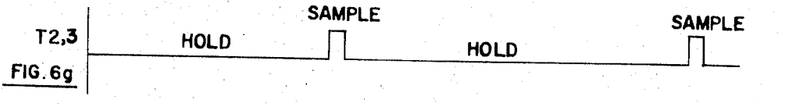
Figure 6H:
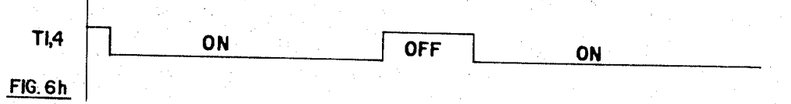
Figure 6I:
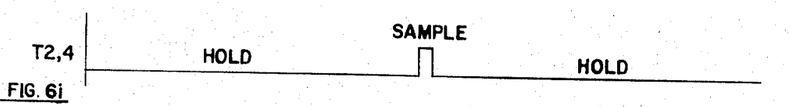

Refer now to FIG. 5, wherein there is shown four identical channels, labeled Channel 1, 2, 3 and 4, for use in supporting a gyroscope rotor 11 along four axes. Thus, there is a force redundancy along any axis. Therefore, for a short period of time, one of the channels can be deactivated while the remaining three channels contribute to the support of the rotor, though at reduced g-load capability (or reduced support capability). Each of the channels shown in FIG. 5 are identical to the single channel shown in FIG. 3 with the exception that two additional transformers TR2 and TR5 are now connected in circuit as drive transformers to apply the 20 KHz bias signal from generator 40 to the support electrodes for each channel. The transformer TR2 has opposite ends of its secondary winding respectively connected to the center taps of transformer TR1 and TR4. The transformer TR5 has opposite ends of its secondary winding respectively connected to the center taps of the identical transformers for channels 2 and 4. At time division multiplexer 70 receives as its input the 20 KHz reference signal and provides as an output coordinated timing signals to the respective switches in an identical manner as applied to the channel shown in FIG. 3, but sequenced so that only one channel out of the four is activated at any one time.

FIGS. 6a through 6i illustrate the switch timing sequence which sequentially activates the switches in each channel in a non-overlapping fashion.

Figure 7:
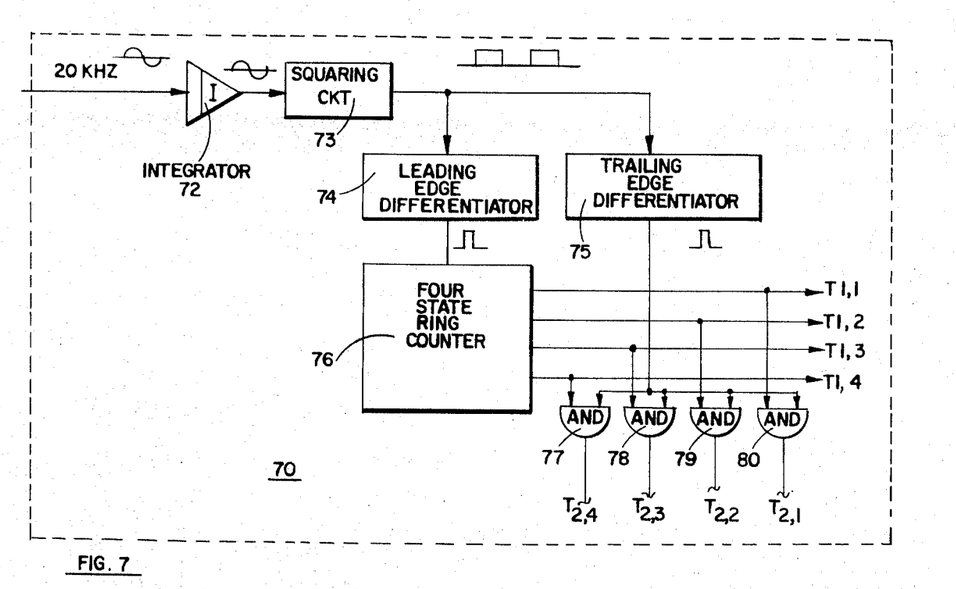
FIG. 7 illustrates in block diagram form one element used in the embodiment of FIG. 5.

The time division multiplexer 70 shown in FIG. 5 with 20 KHz REF input and eight timing signal outputs, is shown in more detail in FIG. 7. The 20 KHz REF signal shown in FIG. 8a feeds an integrator 72 in order to obtain a 90° phase shifted signal as shown by the waveform timing in FIG. 8b. The integrator output is converted into a square wave (FIG. 8c) by the squaring circuit 73. Two basic timing pulse-trains (FIGS. 8d and 8e) are generated by leading edge and trailing edge differentiators, 74 and 75, respectively. The output of the first is pulse coincident with the positive peak in the 20 KHz REF. It drives a four step ring counter 76 which has the characteristic that only one state at a time will be high while the rest must be low. Each state has associated with it an output line which indicates by a high or low signal the condition of that state. When a state goes high at the time of the input pulse, it stays high until the next input pulse drives it low. Then the next state goes high for one input pulse period, while all others are low. This action continues until four input pulses are received at which time a complete cycle of the ring counter has taken place. The lines reflecting the output states are labeled $T_{1,1}$ through $T_{1,4}$ and their waveforms are given in FIGS. 6b to 6i and again in FIGS. 8f and 8g.

Figures 8A, 8G:
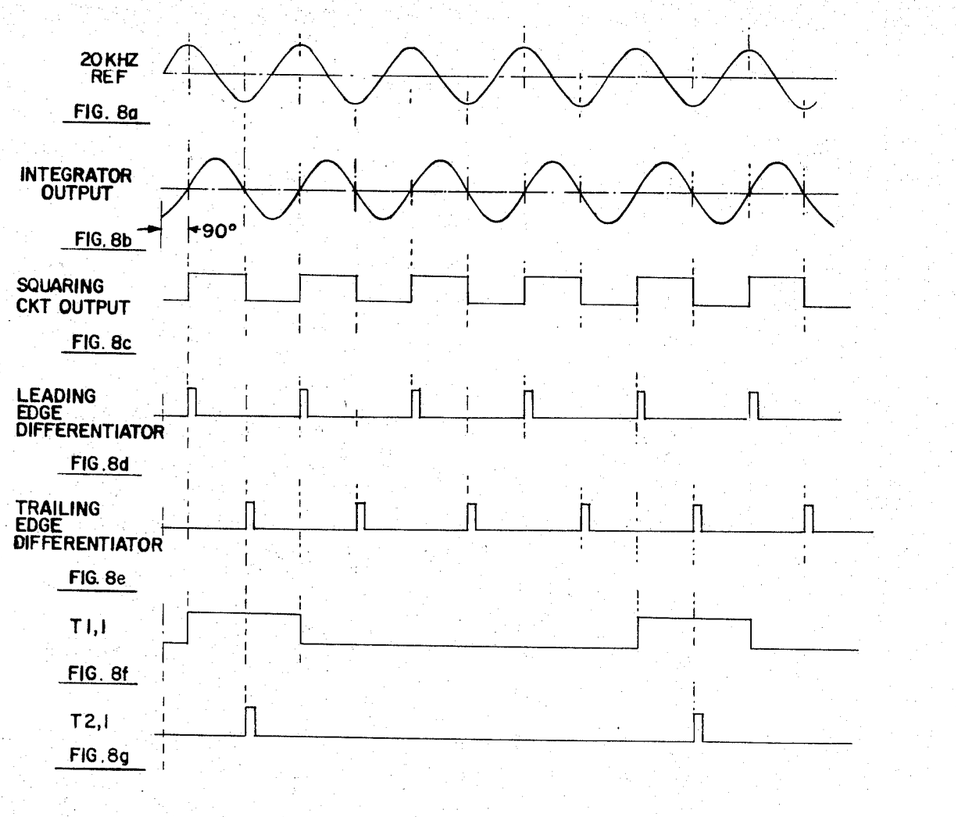

The output of the trailing edge differentiator (TED) is coincident with the negative peak in the 20 KHz REF. When it is "ANDed" with $T_{1,1}$ by AND gate 80, the outcome is the plase $T_{2,1}$ the negative peak sampling pulse for channel 1. The two inputs $T_{1,1}$ and TED pulse, along with the output $T_{2,1}$ are shown in FIGS. 8e, 8f and 8g, respectively. $T_{2,2}$ through $T_{2,4}$ are generated in a similar fashion as shown in FIG. 7.

Figure 9:
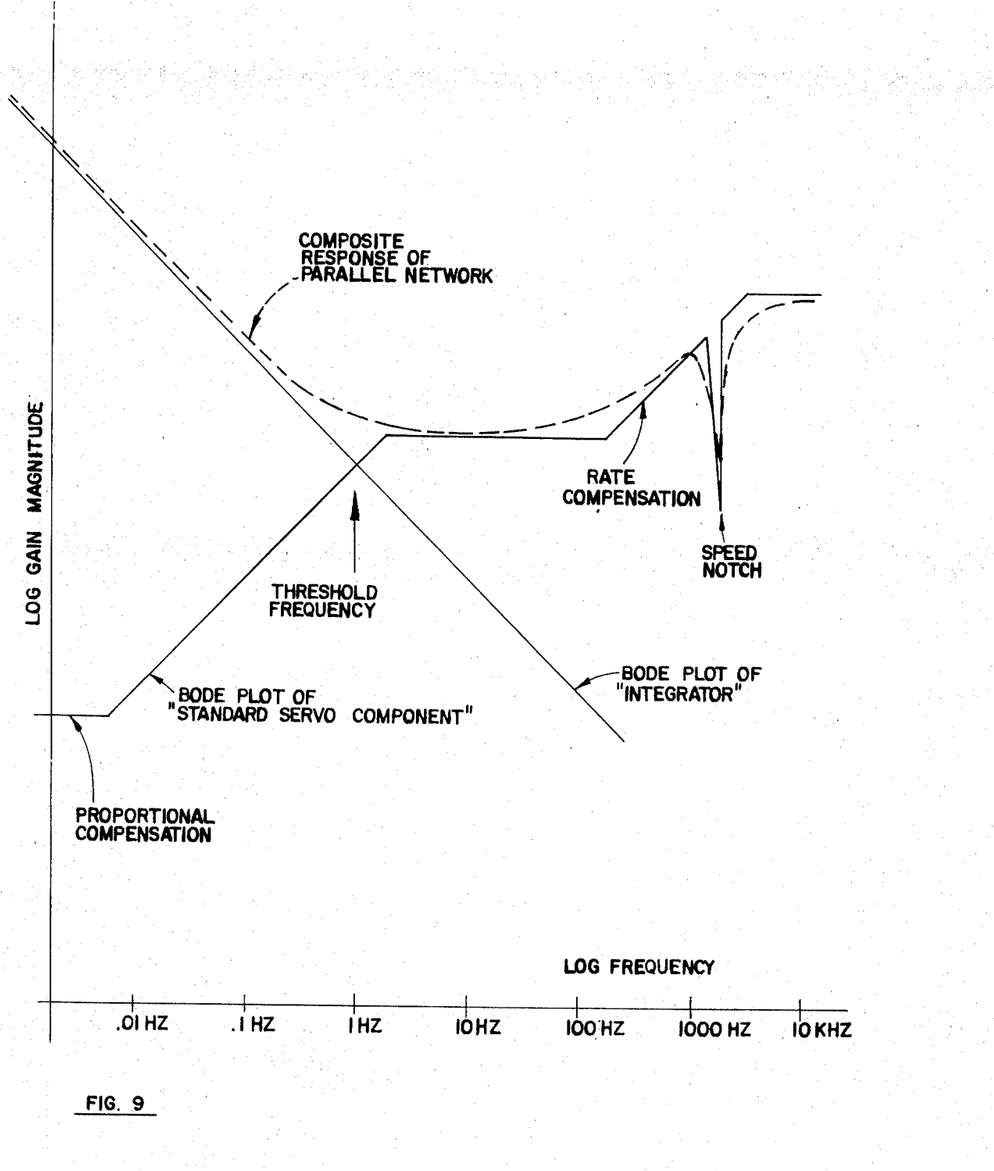
FIG. 9 illustrates by chart the composite response of the embodiment shown in FIG. 5.

FIG. 9 shows the frequency response of the paralleled electronics compensation networks. The log-log plot is standard presentation of gain magnitude versus frequency. The behavior of the integrator channel is represented as a straight line with $-1$ slope. The response of the standard servo component (channel 47) is shown as a straight line segment Bode plot. The crossover network (contained in block 61) is shown as a high pass response with corner frequencies of about 0.01 Hz and 1 Hz. Above 100 Hz the lead network provides rate feedback. At 2500 Hz there is a speed control notch network 62. The summation of the responses of the two parallel networks is shown as a dashed line in FIG. 9. As can be seen, the integrator network predominates below the 1 Hz threshold frequency while the standard servo components take over above this frequency.

Although the invention has been described and illustrated in detail, it is to be clearly understood that the same is by way of illustration and example only and is not to be taken by way of limitation, the spirit and scope of this invention being limited only by the terms of the appended claims.

It is claimed:

1. A suspension and position indicating system for an electrostatic gyroscope of the type which incorporates pairs of electrodes arranged in a symmetrical array around a conductive ball, which ball is adapted to be spun about a spin axis and wherein each pair of electrodes is provided with the system comprised of:

support means for establishing an a-c potential between said conductive ball and a pair of said electrodes for electrostatically supporting said conductive ball between said electrode pair;

sensing means coupled to said support means for providing an a-c position signal which varies as a function of the position of said conductive ball;

amplifying means having an input and an output for providing a control signal to said support means;

first servomechanism means coupled to said sensing means for receiving said provided a-c position signal and for providing a compensated position signal indicative of the displacement of said conductive ball with respect to the desired centered position between said electrode pairs, said first servomechanism means being substantially responsive only to signals above a selected threshold of frequency;

first switch means for controllably connecting the input of said amplifying means to receive either a control signal or a reference potential;

storage means having an input and an output for storing for a limited time signals appearing on its input;

second switch means for controllably connecting and disconnecting the input of said storage means to said sensing means in order to selectively pass the provided a-c position signal;

second servomechanism means connected to receive the output of said storage means and to provide an output signal proportional to the integral of said provided a-c output position signal, said second servomechanism means being substantially responsive only to signals below the selected threshold of frequency;

summing means coupled to said first and second servomechanism means for summing the output signals therefrom to form the control signal which is applied to said first switch means; and switch control means for periodically enabling said first switch means to only receive the reference potential during preselected periods, said switch control means also for a segment of each period enabling said second switch means to pass said provided a-c position signal.

2. A suspension and position indicating system for an electrostatic gyroscope of the type which includes four pairs of electrodes arranged in a symmetrical array around a conductive ball, which ball is adapted to be spun about a spin axis and wherein each pair of electrodes is provided with the system comprised of:

support means for establishing an a-c potential between said conductive ball and a pair of said electrodes for electrostatically supporting said conductive ball between said electrode pair;

sensing means coupled to said support means for providing an a-c position signal which varies as a function of the position of said conductive ball;

amplifying means having an input and an output for providing a control signal to said support means;

first servomechanism means coupled to said sensing means for receiving said provided a-c position signal and for providing a compensated position signal indicative of the displacement of said conductive ball with respect to the desired centered position between said electrode pair;

first switch means for controllably connecting the input of said amplifying means to receive either a control signal or a reference potential;

storage means having an input and an output for storing for a limited time signals appearing on its input;

second switch means for controllably connecting and disconnecting the input of said storage means to said sensing means in order to selectively pass the provided a-c position signal;

second servomechanism means connected to receive the output of said storage means and to provide an output signal proportional to the integral of said provided a-c output position signal;

summing means coupled to said first and said second servomechanism means for summing the output signals therefrom to form the control signal which is applied to said first switch means; and switch control means for periodically enabling said first switch means to only receive the reference potential during preselected periods, said switch control means also for a segment of each period enabling said second switch means to pass said provided a-c position signal, said switch control means sequentially enabling in a non-overlapping manner each of said first and second switch means associated with each electrode pair so as to at all times allow at least three electrode pairs to support said conductive ball.

3. A suspension and position indicating system for an electrostatic gyroscope of the type which incorporates pairs of electrodes arranged in a symmetrical array around a conductive ball, which ball is adapted to be spun about a spin axis, and wherein each pair of electrodes is provided with the system comprised of:

support means for establishing an a-c potential between said conductive ball and a pair of said electrodes for electrostatically supporting said conductive ball between said electrode pair;

sensing means coupled to said support means for providing an a-c position signal which varies as a function of the position of said conductive ball;

circuit means inductively coupling said sensing means to said support means for providing a control signal to said support means to control the a-c potential between said conductive ball and a pair of said electrodes;

first servomechanism means for receiving said a-c position signal and for providing a compensated position signal indicative of the displacement of said conductive ball with respect to the desired center position of said conductive ball between said electrode pair, said first servomechanism means being substantially responsive only to signals above a selected threshold of frequency;

storage means having an input and an output for storing for a limited time signals appearing at its input;

an integrator connected to receive the output of said storage means, said integrator being substantially responsive only to signals below the selected threshold of frequency;

a modulator for modulating the output of said integrator;

summing means connected to receive the output from said first servomechanism means and the output from said modulator for summing the output signals therefrom to form a control signal;

first switch means for controllably allowing said circuit means to receive either the control signal or a reference potential;

second switch means for controllably connecting and disconnecting the input of said storage means to said sensing means in order to selectively pass the provided a-c position signal; and switch control means coupled to said first and second switch means for periodically enabling said first switch means to only receive the reference potential during preselected periods, and for also enabling said second switch means to pass said provided a-c position signal during a portion of each period.

4. A suspension and position indicating system for an electrostatic gyroscope of the type which includes four pairs of electrodes arranged in a symmetrical array around a conductive ball, which ball is adapted to be spun about a spin axis, and wherein each pair of electrodes is provided with the system comprised of:
  support means for establishing an a-c potential between said conductive ball and a pair of said electrodes for electrostatically supporting said conductive ball between said electrode pair;
  sensing means coupled to said support means for providing an a-c position signal which varies as a function of the position of said conductive ball;
  circuit means inductively coupling said sensing means to said support means for providing a control signal to said support means to control the a-c potential between said conductive ball and a pair of said electrodes;
  first servomechanism means for receiving said a-c position signal and for providing a compensated position signal indicative of the displacement of said conductive ball with respect to the desired center position of said conductive ball between said electrode pair;
  storage means having an input and an output for storing for a limited time signals appearing at its input;
  an integrator connected to receive the output of said storage means;
  a modulator for modulating the output of said integrator;
  summing means connected to receive the output from said first servomechanism means and the output from said modulator for summing the output signals therefrom to form a control signal;
  first switch means for controllably allowing said circuit means to receive either the control signal or a reference potential;
  second switch means for controllably connecting and disconnecting the input of said storage means to said sensing means in order to selectively pass the provided a-c position signal; and
  switch control means coupled to said first and second switch means for periodically enabling said first switch means to only receive the reference potential during preselected periods and for also enabling said second switch means to pass said provided a-c position signal during a portion of each period, said switch control means sequentially enabling in a non-overlapping manner each of said first and second switch means associated with each electrode pair so as to at all times allow at least three electrode pairs to support said conductive ball.

5. A suspension and position indicating system for an electrostatic gyroscope of the type which incorporates pairs of electrodes arranged in a symmetrical array around a conductive ball, which ball is adapted to be spun around a spin axis, said system comprising:
  a subsystem for each pair of electrodes comprising:
    support means for electrostatically supporting said conductive ball between said electrode pair;
    sensing means coupled to said support means for developing a position signal which varies as a function of the position of said conductive ball between said electrode pair;
    first means, coupled to said sensing means, being responsive to higher frequency components in the position signal for continuously developing a compensated position signal indicative of the relative displacement of said conductive ball between said electrode pair;
    second means, coupled to said sensing means, being responsive to lower frequency components in the position signal received during a portion of each of associated preselected time periods for developing a first signal proportional to the integral of the position signal;
    summing means coupled to said second and first means for summing the first and compensated position signals therefrom to form a composite signal;
    third means coupled to said support means for applying a control signal thereto in response to the composite signal; and
    switching means coupled to said second and third means for preventing said third means from applying the control signal to said support means during each of the preselected time periods and for allowing said second means to receive the lower frequency components in the position signal during the portion of each of the preselected time periods; and
  control means coupled to all of said switching means for sequentially enabling in a non-overlapping manner each of said switching means so as to allow at all times at least all but one of said electrode pairs to support said conductive ball.

6. A system of claim 5 wherein said second means includes:
  storage means for storing a limited time signal information derived from the position signal during each portion of each preselected time period;
  an integrator coupled to said storage means for developing integrated signal information; and
  fourth means, coupled to said integrator, being responsive to the integrated signal information therefrom for developing and applying the first signal to said summing means.

7. The system of claim 6, wherein said control means develops a first switching signal during the portion of each preselected time period and a second switching signal during each preselected time period, and said switching means includes:
  first switch means, coupled to said third means, being responsive to each second switching signal for preventing said third means from applying the control signal to said support means during each preselected time period; and
  second switch means, coupled to said second means, being responsive to each first switching signal for allowing said second means to receive the lower frequency components in the position signal during the portion of each preselected time period.

* * * * *